(12) United States Patent
Lambrechts (10) Patent No.: US 11,165,380 B2
(45) Date of Patent: Nov. 2, 2021

(54) LEAD ANGLE DETECTION FOR BLDC MOTOR CONTROL

(71) Applicant: Melexis Technologies NV, Tessenderlo (BE)

(72) Inventor: Marc Lambrechts, Leuven (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 16/867,816

(22) Filed: May 6, 2020

(65) Prior Publication Data

US 2020/0358386 A1 Nov. 12, 2020

(30) Foreign Application Priority Data

May 6, 2019 (EP) .................................. 19172867

(51) Int. Cl.
*H02P 21/09* (2016.01)
(52) U.S. Cl.
CPC .................................. *H02P 21/09* (2016.02)
(58) Field of Classification Search
CPC ........................................................ H02P 21/09
See application file for complete search history.

(56) References Cited

U.S. PATENT DOCUMENTS

| 8,212,508 | B2 | 7/2012 | Paintz et al. |
| 8,692,492 | B2 | 4/2014 | Sato |
| 9,998,059 | B2 | 6/2018 | Lee et al. |
| 2011/0074327 | A1* | 3/2011 | Paintz ............... H02P 25/03 318/400.35 |
| 2014/0265964 | A1* | 9/2014 | Yersin ............... H02P 6/182 318/400.26 |
| 2017/0373623 | A1* | 12/2017 | Braat ............... H02P 6/28 |

FOREIGN PATENT DOCUMENTS

| EP | 2302785 A2 | 3/2011 |
| EP | 3261245 A1 | 12/2017 |

OTHER PUBLICATIONS

Search Report from corresponding EP Application No. 19172867.4, dated Oct. 11, 2019.

* cited by examiner

*Primary Examiner* — Zoheb S Imtiaz
(74) *Attorney, Agent, or Firm* — Workman Nydegger (57) ABSTRACT

A lead angle estimator is provided for estimating a lead angle of a brushless DC motor. The lead angle is the angle between a phase-voltage-vector of a phase-voltage, and a phase-current-vector of a phase-current. The lead angle estimator comprises a sampling unit and a processing unit. The sampling unit is adapted for obtaining phase-samples, which are a measure of the phase-current. The processing unit is adapted for estimating the lead angle by calculating a difference of the phase-samples in a extremum period around a maximum or around at least the phase-voltage, and by normalizing the obtained difference.

14 Claims, 5 Drawing Sheets

LEAD ANGLE DETECTION FOR BLDC MOTOR CONTROL

FIELD OF THE INVENTION

The invention relates to the field of methods and systems for estimating the lead angle between the voltage vector and the current vector of a phase of a brushless DC motor. More specifically it relates to sensorless methods and systems for estimating the lead angle and to methods and systems for driving a brushless DC motor.

BACKGROUND OF THE INVENTION

Sensorless motor control is used on an increasing number of electrical motors. An important reason therefore is that the removal of position sensors reduces the bill-of-material or sensor calibration cost. The latest trend is, that the motor control should use a smooth continuous sine wave current to reduce acoustic noise, e.g. for electric and hybrid cars. The acoustic noise level in these cars is quite low, because of the missing combustion engine. This means, that every electric motor, e.g. the climate fan, must also be low in audible acoustic emissions.

A major role in BLDC (brushless direct current) motor control plays the measurement and later the control of the so called lead angle, what is the relation of the applied voltage vector and the current in the motor.

When using a continuous sine current, the traditional method of BEMF (back electromotive force) sensing for sensorless drive is not possible, as BEMF requires a high-impedance motor phase without current. A sensing window must be created, in what BEMF can be measured as described for instance in U.S. Pat. No. 8,212,508 B2. This created sensing window might generate some acoustic noise.

Figure 1:
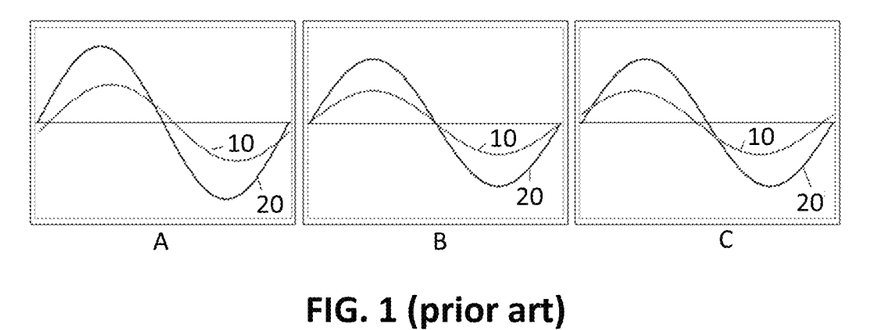
FIG. 1 shows the BEMF voltage and the phase-current in function of time for lagging, synchronized, and leading phase-currents.

FIG. 1 shows the BEMF voltage 10 and the phase-current 20 in function of time for a sine driven motor. In FIG. 1A the phase-current has a lag in view of the BEMF voltage and in FIG. 1C the phase-current is leading before the BEMF voltage. In FIG. 1B the current and the BEMF voltage are aligned. The motor drive is most efficient when the BEMF voltage and phase current are aligned.

An optimal lead angle calculation for BLDC motors is e.g. disclosed in IEEE 978-1-4244-5393-1 in 2010. However, this disclosure handles the lead angle calculation of a sensor based BLDC motor control under use of a trapezoidal wave form driving.

Figure 2:
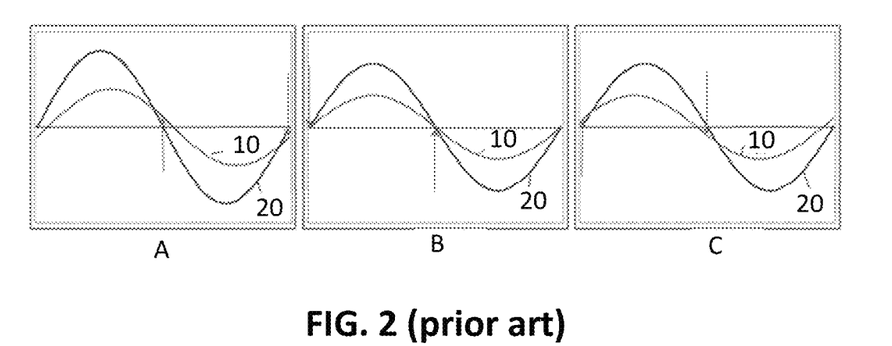
FIG. 2 shows the BEMF voltage and the phase-current in function of time. The arrows indicate the moment of sampling the BEMF voltage.

U.S. Pat. No. 8,692,492 B2 discloses, for a sensor based BLDC motor control, a table based lead angle setting and the selection of lead angles in dependence of the motor current. Such a method needs a careful characterization of the motor and the application in advance in order to generate and to store such a lead angle table. In U.S. Pat. No. 8,692,492 B2 the BEMF voltage is sampled when the phase current is zero. This is illustrated by the arrows in FIG. 2. In FIG. 2A there is a lead angle between the phase-current 20 and the BEMF voltage 10. This corresponds with an underdrive of the motor. In FIG. 2B the phase-current 20 and the BEMF voltage 10 are aligned. This corresponds with an efficient drive of the motor. In FIG. 2C there is a lag angle between the phase-current 20 and the BEMF voltage 10. This corresponds with an overdrive of the motor.

The most-used method in sensor less BLDC motor applications is Field-Oriented-Control as this is disclosed for instance in U.S. Pat. No. 9,998,059 B2, in what such a sensing window does not exist, but this requires high processing power as there are several transformations (e.g. from a tree phase a, b, c, current system into a two axis d, q system), which drives up the IC cost, an issue for high-volume applications, in what low cost plays a major role.

There is therefore a need for methods and systems for measuring the lead-angle without using a position sensor.

SUMMARY OF THE INVENTION

It is an object of embodiments of the present invention to provide good methods and systems for measuring the lead angle between the voltage vector and the current vector of a phase of a brushless DC motor and to methods and systems, which are using the lead angle as feedback signal, for driving the motor.

The above objective is accomplished by a method and device according to the present invention.

In a first aspect embodiments of the present invention relate to a lead angle estimator for estimating a lead angle of a brushless DC motor. The lead angle is the angle between a phase-voltage-vector of a phase-voltage, and a phase-current-vector of a phase-current.

The lead angle estimator comprises a sampling unit and a processing unit. The sampling unit is adapted for obtaining phase-samples which are a measure of the phase-current. The processing unit is adapted for estimating the lead angle by calculating a difference of the phase-samples in a extremum period around a maximum or around a minimum of the phase-voltage, and by normalizing the obtained difference.

It is an advantage of embodiments of the present invention that the lead angle can be estimated by simple operations. In embodiments of the present invention the arctangens may be taken of the obtained division. This is, however, not strictly required.

a. It is an advantage of embodiments of the present invention that the difference of the phase-samples gives an indication of the slope of the current during the extremum period. By normalizing this difference the lead angle can be estimated independent of the current size.

b. Lead angle estimators according to embodiments of the present invention may for example be used for estimating the lead angle of 1-phase, 2-phase or 3-phase brushless DC motors. Lead angle estimators according to embodiments of the present invention are particularly advantageous for estimating the lead-angle of 1-phase brushless DC motors (e.g. single coil brushless DC motors).

In embodiments of the present invention the lead angle estimator is adapted for obtaining the phase-samples only during the extremum period.

In embodiments of the present invention the extremum period is a period between 30° and 60°, centered around the maximum or minimum of the phase voltage.

In embodiments where 0° is defined as the maximum or minimum of the phase voltage, this implies an extremum period between +x° and −x°, wherein x is a value between 30° and 60°. In embodiments where y° is defined as the maximum or minimum of the phase voltage, this implies an extremum period between (y+x)° and (y−x)°, wherein x is a value between 30° and 60° (y may for example be equal to 90°.

In embodiments of the present invention the sampling unit comprises a voltage sensor adapted for measuring a voltage over a shunt resistor of the brushless DC motor, to obtain voltage samples which are a measure of the phase-current, and the sampling unit is adapted for deriving the phase-samples from the voltage samples.

In embodiments of the present invention the sampling unit comprises an interface for triggering the sampling unit for obtaining the phase-samples.

In embodiments of the present invention the processing unit is adapted for normalizing the obtained difference by dividing the difference of the phase-samples with an average of the phase-samples during the extremum period.

In embodiments of the present invention the processing unit is adapted for calculating the difference between at least one phase-sample at the end of the extremum period and at least one phase-sample at the beginning of the extremum period.

Embodiments of the present invention relate to a motor driver for driving a brushless DC motor. The motor driver comprises a lead angle estimator in accordance with embodiments of the present invention, and a driver unit for applying a phase-voltage per phase of the brushless DC motor wherein the processing unit is adapted for controlling the phase-voltage in a feedback loop with the estimated lead angle as feedback signal.

In embodiments of the present invention the processing unit is adapted for controlling the driver unit. The processing unit may be adapted for applying the phase-voltage as a PWM voltage.

In embodiments of the present invention the processing unit is adapted for controlling the driver unit for applying the phase-voltage in discrete steps.

In embodiments of the present invention the processing unit is adapted for triggering the phase sampling synchronous with the discrete steps of the phase-voltage.

In embodiments of the present invention the phase sampling may be triggered such that the phase sampling is only applied during the extremum period.

a. In embodiments of the present invention the processing unit is adapted for triggering the phase sampling via the interface for triggering the phase sampling of the sampling unit.

In embodiments of the present invention the feedback loop is a PID control loop.

In embodiments of the present invention the processing unit is adapted for controlling the driver unit for applying a sine wave shaped phase-voltage.

In a second aspect embodiments of the present invention relate to a method for estimating a lead angle between a phase-voltage-vector of a phase-voltage of a brushless DC motor, and a phase-current-vector of a phase-current of the brushless DC motor. The method comprises:

obtaining phase-samples which are a measure of the phase-current, estimating the lead angle by calculating a difference of the phase-samples in a extremum period around a maximum or around a minimum of the phase-voltage, and by normalizing the obtained difference.

Embodiments of the present invention relate to a method for driving a brushless DC motor. The method comprises:

estimating the lead angle between a phase-voltage-vector of a phase-voltage of the brushless DC motor, and a phase-current-vector of a phase-current of the brushless DC motor using a method for estimating a lead angle in accordance with embodiments of the present invention, controlling the phase-voltage in a feedback loop with the estimated lead angle as feedback signal.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a lead angle estimator 110 for estimating a lead angle of a brushless DC (BLDC) motor. The lead angle is the angle between a phase-voltage-vector of a phase-voltage of the brushless DC motor, and a phase-current-vector of a phase-current of the brushless DC motor, the lead angle estimator comprising a sampling unit 114 and a processing unit 112.

The sampling unit 114 is adapted for obtaining phase-samples which are a measure of the phase-current.

The processing unit 112 is adapted for estimating the lead angle by calculating a difference of the phase-samples in a extremum period around a maximum or around a minimum of the phase-voltage, and by normalizing the obtained difference.

Figure 3:
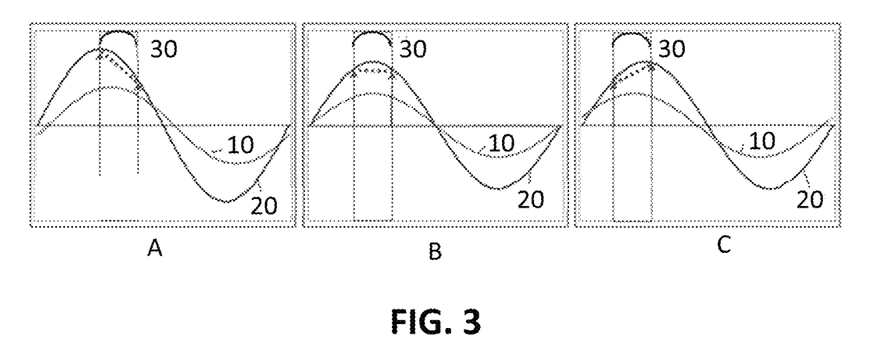
FIG. 3 illustrates the principle of lead-angle estimation in accordance with embodiments of the present invention.

The principle of the lead-angle estimation according to embodiments of the present invention is illustrated in FIG. 3. This figure shows the BEMF voltage (10), the phase-current (20) and the phase-voltage (30) during an extremum period around the maximum of the phase-voltage. In this example the phase-current is sampled during 60° commutation. In FIG. 3A there is a phase-current-phase-voltage lead angle corresponding with an underdrive of the motor. In this example the phase-current has a negative slope during the extremum period. In FIG. 3B the phase-current and phase-voltage are aligned corresponding with an efficient drive of the motor. In this example the phase-current is constant during the extremum period. In FIG. 3C there is a phase-current-phase-voltage lag angle corresponding with an overdrive of the motor. In this example the phase-current has a positive slope during the extremum period.

Figure 5:
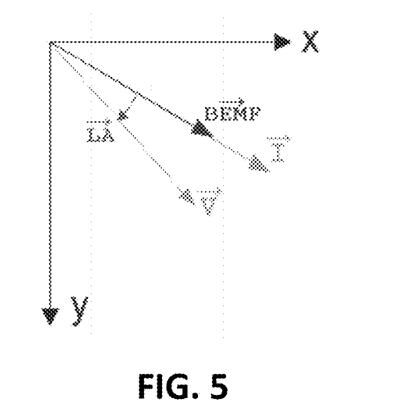
FIG. 5 shows a graphic representation of a sine-phase-voltage V, a phase-current I and the BEMF voltage of a sensorless BLDC motor, as clock-wise rotating vectors.

The relation between the phase-voltage, the phase-current and the lead-angle is illustrated in FIG. 5. FIG. 5 shows a graphic representation of a sine-phase-voltage V, a phase-current I and the BEMF voltage of a sensorless BLDC motor, as clock-wise rotating vectors. The lead-angle LA is the angle between the phase-voltage and the phase-current.

It is an advantage of embodiments of the present invention that a lead-angle measurement can be done under use of a low calculation power of the processing unit (e.g. an embedded CPU), that uses only the phase-samples which are a measure of the phase-current for estimating the lead angle. As illustrated in FIG. 3 these samples are the samples in a extremum period around a maximum or around a minimum of the phase-voltage.

In embodiments of the present invention the sampling unit comprises a voltage sensor 115 for measuring a voltage over a shunt resistor 121 of the brushless DC motor. These voltage samples are a measure of the phase-current.

Embodiments of the present invention may relate to a motor driver 100 for driving a brushless DC motor. Such a motor driver 100 comprises a lead angle estimator according to embodiments of the present invention and a driver unit 120 for applying a driver signal to the brushless DC motor. This driver signal generates a current through the one or more phases of the brushless DC motor. The current may be generated by an average voltage difference over a motor coil of a brushless DC motor, generated by a full bridge output driver. A phase-voltage may be generated per phase of the brushless DC motor. There may be a plurality of coils per phase of the brushless DC motor. The driving signal may be a pulse width modulated (PWM) signal, or a linear controlled signal. The processing unit 112 is adapted for controlling the phase-voltage in a feedback loop with the estimated lead angle as feedback signal.

Figure 9:
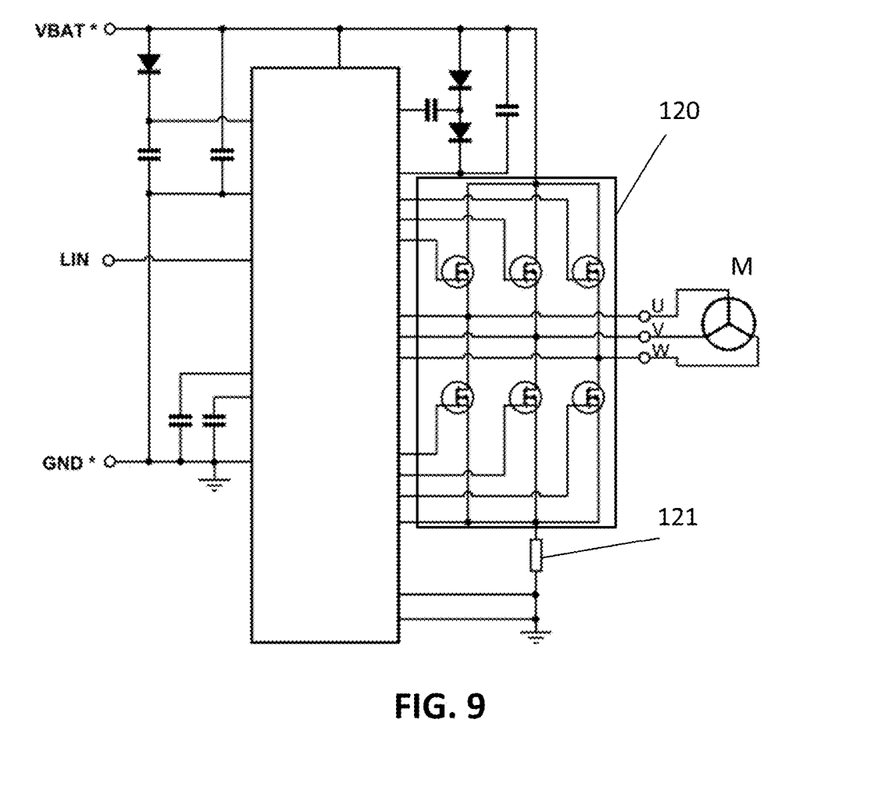
FIG. 9 shows a diagram of a brushless DC motor driver. In the diagram a driver unit, and a current shunt are shown.

FIG. 9 shows a diagram of a brushless DC motor driver. The diagram shows a driver unit 120 which, in this example, is a full bridge driver. The driver unit 120 is electrically connected with the motor and with a current shunt 121 which is connected with the ground. The current shunt may for example be 5 mΩ for 20 $A_{pk}$.

In embodiments of the present invention the brushless DC motor may be driven by a voltage with a sine-wave shape. BLDC, stepper, or single-coil motors may be used.

Figure 6:
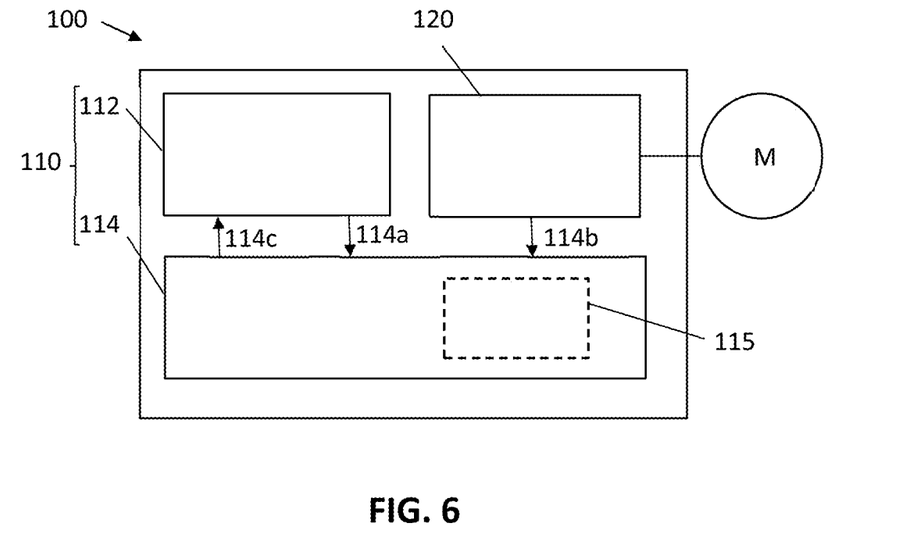
FIG. 6 shows a schematic drawing of a motor driver in accordance with embodiments of the present invention.
Figure 7:
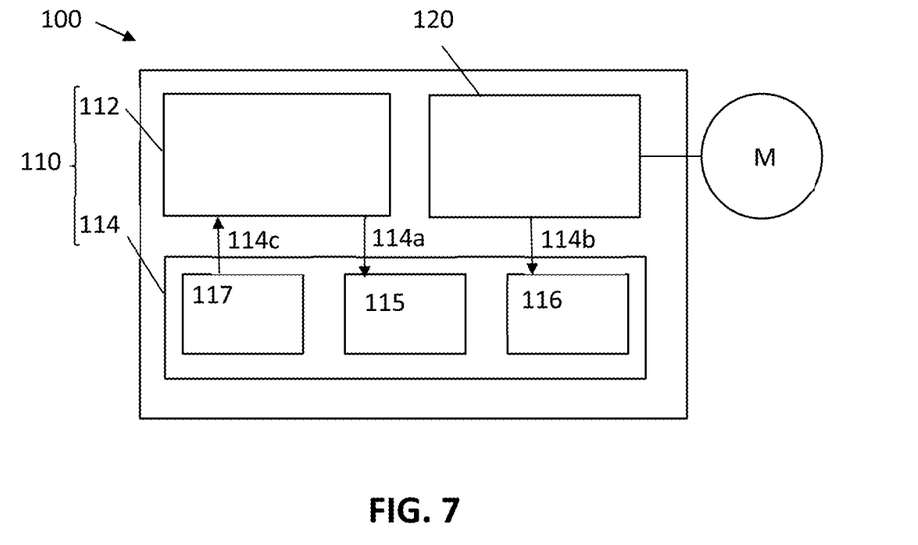
FIG. 7 shows a sensorless motor control loop using sine drive and simple lead-angle measurement in accordance with embodiments of the present invention.

Exemplary embodiments of motor drivers 100 in accordance with embodiments of the present invention are schematically illustrated in FIGS. 6 and 7. FIG. 6 shows a lead angle estimator 110 comprising a sampling unit 114 which is adapted for obtaining phase-samples which are a measure of the phase-current, and a processing unit 112 which is adapted for estimating the lead angle by calculating a difference of the phase-samples in a extremum period around a maximum or around a minimum of the phase-voltage, and by normalizing the obtained difference. The phase-current signal or a related signal (e.g. a signal which is proportional to the phase-current or is in any other way a measure of the phase-current) is passed to the sampling unit 114 (this is indicated by the arrow 114*b*). The sampling unit may comprise an interface 114*a* for triggering the sampling unit for obtaining the phase-samples. In the example of FIG.

6 the processing unit is adapted for triggering the sampling unit via this interface. This allows to obtain the phase-sample during the extremum period. In case of a PWM driven motor, it also allows to do the phase sampling synchronous with the PWM. The sampled data may be passed to the processing unit via an interface 114c of the sampling unit 114 and the processing unit 112. The sampling unit 114 may comprise a voltage sensor 115 for measuring a voltage over a shunt resistor 121 of the brushless DC motor, to obtain voltage samples which are a measure of the phase-current. FIG. 6 shows a driver unit 120 for applying a phase-voltage per phase of the brushless DC motor. The processing unit 112 is adapted for controlling the phase-voltage in a feedback loop with the estimated lead angle as feedback signal.

FIG. 7 shows a sensorless motor control loop using sine drive and simple lead-angle measurement in accordance with embodiments of the present invention. In embodiments of the present invention the motor may be driven by applying the phase-voltage in discrete steps. This may be done by dividing one electrical rotation in a number of micro-steps (e.g. 48 micro-steps which corresponds with 7.5° electrical degree per micro-step). The number of micro-steps per electrical rotation may for example range between 24 and 384 micro-steps ($6 \times 2^2$ to $6 \times 2^6$) In such a micro-step driven motor, the processing unit 112 of FIG. 7 may be adapted for lead angle calculation per micro-step. The processing unit 112 in this example is adapted for generating PID loop updates per micro-step. In embodiments of the present invention the processing unit is adapted for receiving a lead-angle target and a voltage target as input variables for the control loop. This is for example the case for the motor driver of FIG. 7. The processing unit 112 of FIG. 7 outputs a PWM sine drive for the FETs of the driver unit 120 of FIG. 7. In this example the driver unit 120 comprises a pre-driver and powerFETs. These may for example be adapted for generating a current of more than 1 A. Also, a shunt resistor 121 is present for current sensing of the current through the phases of the motor. In this exemplary embodiment of the present invention the analog motor phase current(s) are passed to the ADC channel multiplexer 116 of the sampling unit 114. The signal(s) (e.g. the voltage over a shunt resistor 121) are passed by the multiplexer to an ADC 115. The multiplexer is, however, not strictly required. In alternative embodiments of the present invention the voltage over the shunt resistor 121 may be sampled by the ADC without the need for a multiplexer. When an ADC channel multiplexer 116 is present, it may for example also be used for passing other signals to the ADC such as for example phase voltages, supply voltage, temperature. The presence of the multiplexer therefore enables using the ADC for multiple purposes. The supply voltage may for example be sampled via the ADC to compensate for supply fluctuations. Also, in some embodiments, the phase voltage my be sampled to determine the extremum period around the maximum or around the minimum of the phase-voltage. The sampling unit 114, moreover, comprises a voltage sensor 115. This voltage sensor comprises an ADC. The ADC is adapted for synchronized PWM sampling at a rate of at least one value per micro-step. The sampling is synchronized by the processing unit 112. The sampled values are stored in the memory 117 of the sampling unit 114. This memory 117 can be read by the processing unit 112. In FIG. 7 the following interfaces are schematically drawn:

114a for triggering the sampling,
114b for providing a connection between the driver unit 120 and the sampling unit 114,
114c for transferring the sampled data from the sampling unit 114 to the processing unit 112.

In a second aspect embodiments of the present invention relate to a method for estimating a lead angle between a phase-voltage-vector of a phase-voltage of a brushless DC motor, and a phase-current-vector of a phase-current of the brushless DC motor.

The method comprises:
obtaining phase-samples which are a measure of the phase-current,
estimating the lead angle by calculating a difference of the phase-samples in a extremum period around a maximum or around a minimum of the phase-voltage, and by normalizing the obtained difference.

Embodiments of the present invention may also relate to a method for driving a brushless DC motor. Such a method comprises:
estimating the lead angle between a phase-voltage-vector of a phase-voltage of the brushless DC motor, and a phase-current-vector of a phase-current of the brushless DC motor using a method according to embodiments of the present invention,
controlling the phase-voltage in a feedback loop with the estimated lead angle as feedback signal.

In embodiments of the present invention the motor may be driven in a sensorless sine mode. When the phase voltage is applied in discrete steps, the processing unit 112 may comprise memory comprising a sine table, in which the phase voltages are stored per micro-step. Such a table may for example comprise 48 values. One or more motor phase(s) may be driven in steps with a voltage which are a fraction of the table values. These table values may be representing the PWM-modulated rotating voltage vector.

In embodiments of the present invention the phase-currents of 2 motor phases (BLDC, Stepper), or of 1 motor phase (single-coil), may be measured in each micro-step in the drive period around a maximum phase-voltage or around a minimum of the phase-voltage. This period around the maximum or minimum of the phase-voltage is also referred to as the extremum period. In embodiments of the present invention the extremum period for the maximum voltage may be used. The period may for example be between [60° . . . 120°] or between [240° . . . 300°] electrical degree assuming the phase-voltage=V*SIN(electrical angle).

It is an advantage of embodiments of the present invention that the lead-angle between the phase-voltage and the phase-current vector can be approximated by a simple formula using the phase-current samples measured around the maximum phase-voltage. In case of a BLDC motor example with 3 phases, this lead-angle estimation can be done 6 times per electrical period or every 60 electrical degree (the different phase-voltages are shifted 120 deg with respect to each-other).

In embodiments of the present invention the processing unit is adapted for estimating the lead angle by calculating a difference of the phase-samples in a extremum period around a maximum or around a minimum of the phase-voltage, and by normalizing the obtained difference. The difference may for example be taken between the last and the first phase-sample. This difference may for example be divided by the average of the phase-samples in the extremum period for normalizing the difference. The inventors have found that the tangent of the lead angle is proportional to the normalized difference. Thus, by taking the inverse tangent of the normalized difference (possibly multiplied by a multiplier correction factor), the lead angle can be calculated. In embodiments of the present invention the inverse tangent may even not be calculated and the normalized difference on itself may be used as a measure for the lead angle. The reason therefore being that for small lead angles the normalized difference is a good approximation of the inverse tangent thereof. Methods according to embodiments of the present invention may for example be used for lead angles between −60° and 60°. It is advantageous that this range is higher that what is mostly needed for motors.

In the example with the 48-micro-steps, 8 current samples I1 . . . I8 may for example be taken in the extremum period [60° . . . 120°] around the 90° voltage maximum. In this example the following approximation holds:

$$\text{TAN(Lead-angle(current-voltage))} \approx (I8-I1)/\text{average} (I1 \ldots I8)$$

In this formula "Lead-angle(current-voltage)" corresponds with the angle between the phase-current-vector and the phase-voltage-vector, as illustrated in FIG. 5. In an example with 48-micro-steps, and 9 current samples I1 . . . I9 in the extremum period [60° . . . 120°] around 90° voltage maximum, the following formula may be used for calculating an approximation of the lead-angle:

$$\text{TAN(Lead-angle(current-voltage))} \approx (I9-I1)/\text{average} (I1 \ldots I9)$$

Whereas in the previous example the normalization factor was equal to the average of the phase-samples during the extremum period, in a case were an odd number of phase-samples is taken, the normalization factor may be calculated differently. The two outer phase samples may be summed and divided by two to obtain a first result, and the average may be calculated of the other phase-samples and the first result.

Thus, for 9 phase-samples (where I5 is in the middle), the following formula may be used for calculating the normalization factor:

$$\text{Norm.} \approx (\frac{1}{2}*(I1+I9)+(I2+I3+I4+I5+I6+I7+I8))/8$$

In embodiments of the present invention the normalization factor will behave as a A*cosine function of the lead-angle.

It is an advantage of embodiments of the present invention that averaging (for calculating the normalization factor) implements a filtering effect for more reliable calculation results.

In embodiments of the present invention the difference of the phase-samples represents the derivative of the current-curve.

In embodiments of the present invention the difference may be taken between at least one phase-sample at the end of the extremum period and at least one phase-sample at the beginning of the extremum period. For example the two phase-samples at the end of the extremum period may be subtracted from two phase-samples at the beginning of the extremum period. The sum of two differences may be taken. The obtained result may then be divided by two. Difference averaging may for example be done on the first N phase-samples at the beginning of the extremum period and on the last N phase-samples at the end of the extremum period. N may for example be an integer between 2 and 5.

Thus, in the example with 9 samples per extremum period, where I5 is the middle, the formula for obtaining the difference of the phase-samples can be optimized.

$$\text{difference} \approx ((I8+I9)-(I1+I2))/2$$

In embodiments of the present invention the current differential will behave as a A*sine function of the lead-angle. Hence, the ratio of the current differential and the normalization factor behaves as a tangential function of the lead-angle.

Using more sample values per extremum period implements a filtering effect for more reliable calculation results.

In embodiments of the present invention the extremum period may be a period between 30° and 120°, or for example between 60° and 90°, or for example around 60°. The lead angle estimator may be adapted for obtaining the phase-samples only during the extremum period. The number of microstep phase-samples obtained during the extremum period may for example be between 4 and 12, or even between 6 and 10. The number of microstep phase-samples can for example be 8.

In embodiments of the present invention the processing unit may be adapted for applying a multiplier correction factor C when normalizing the obtained difference. Thus a better approximation of the tangent of the lead angle can be obtained.

Since the purpose of calculating the normalized difference of phase-samples in the extremum period is to reduce the processing time by reducing the number of operations for estimating the lead angle, the multiplier correction factor may not necessarily be used, and the inverse tangent may not necessarily be calculated, considering that:

Stable lead-angles in a sensorless motor application, which have values in the ±30° region or smaller, are obtained. In that case the tangent value is close to the lead angle, and hence it is not required to calculate the inverse tangent or it is not required to calculate a tangent table.

The lead-angle is used in a control loop (e.g. a PID-control-loop with its own Kp,Ki,Kd factors). The control loop may be implemented such that it compensates for the absence of the multiplier correction C. In that case the multiplier correction C is not needed to reduce calculation load.

Methods according to embodiments of the present invention can be used for sensorless driving of brushless motors. The motors may be current- or voltage-driven. The applied voltage- or current-wave may have a sine wave shape. This may be achieved in an analog driven way or in a PWM driven way. In an analog driven way (when applying a linearly controlled signal), both the current and the voltage have a sine wave. In a PWM driven way, the applied signal is a PWM voltage and the resulting current has a sine wave shape. Methods according to embodiments of the present invention may be applied to single-phase motors (e.g. single-coil-fan), 2-phase motors (eg. Bipolar steppers), 3-phase motors (eg. BLDC).

A motor drive method according to embodiments of the present invention enables to estimate the real lead-angle without any sensor, when applying a low-noise sine drive to the 1-2-3 phase motor. The calculated lead-angle value is used in a feedback loop which may for example be a PID feedback loop. Thus, the driving waveforms can be adjusted such that they are synchronous with the rotor rotation.

Figure 8:
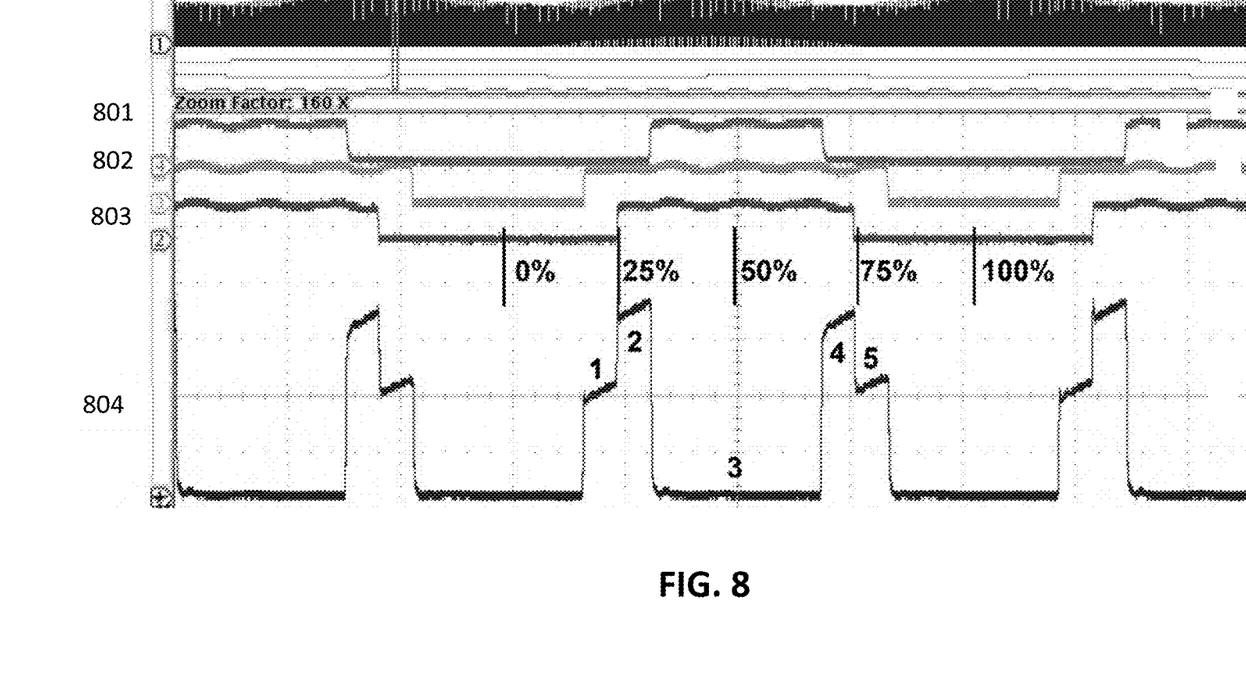
FIG. 8 shows the phase voltages and the shunt voltages measured during a PWM period, when driving the BLDC motor with a SVM PWM-scheme

In embodiments of the present invention the processing unit 112 is adapted for applying the phase-voltage as a pulse width modulated (PWM) voltage. A current measurement example with 3-phase space vector modulation (SVM) drive of a BLDC motor is shown in FIG. 8. In this example the different phase currents are measured by using only one shunt. These curves are measured when applying a SVM PWM-scheme to drive a BLDC motor in sine-mode (center-aligned space vector modulation on 3-phases). An alternative PWM-scheme could be used, with sine drive on 2-phases and $3^{rd}$ phase constant, with adapted phase-current sample timing in synchronization with the applied PWM-scheme. In both cases the concept of estimating the lead angle by calculating the normalized difference of the phase-samples around a minimum or a maximum of the phase-voltage remains the same.

In FIG. 8, curve 801 corresponds with the voltage of a first phase of the BLDC motor. Curve 802 corresponds with the voltage of a second phase of the BLDC motor. Curve 803 corresponds with the voltage of a third phase of the BLDC motor. Curve 804 corresponds with the shunt voltage. Five periods 1, 2, 3, 4, and 5 are indicated on the shunt voltage curve. In period 1 the current is flowing from the second phase to the first and the third phase. In period 2 the current is flowing from the second and the third phase to the first phase. In period 3 no current is flowing. In period 4 the current is flowing from the second and the third phase to the first phase. In period 5 the current is flowing from the second phase to the first phase and the third phase.

The sampling unit may be adapted for obtaining the phase-samples which are a measure of the phase-current of the first phase by measuring the shunt voltage in period 2 or 4 (i.e. when the current through the phase to be measured equals the current through the shunt). The measurement may for example be done at the end of period 4 (e.g. at 75% of a PWM period). The sampling unit may be adapted for obtaining the phase-samples which are a measure of the phase-current of the second phase by measuring the shunt voltage in period 1 or 5 (i.e. when the current through the phase to be measured equals the current through the shunt). The measurement may for example be done at the end of period 1 (e.g. at 25% of a PWM period). The sampling unit may be adapted for calculating the phase-current of the third phase because the sum of all currents equals zero.

Figure 4:
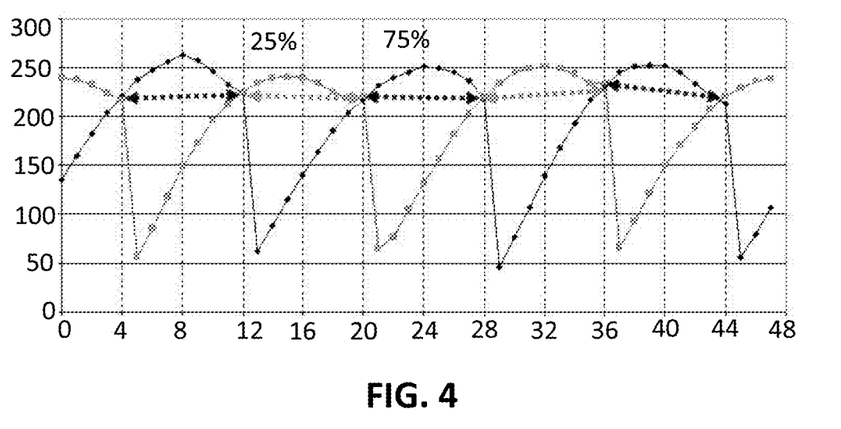
FIG. 4 shows the phase current (mA) sampled per micro-step at 25% and at 75% of the PWM period, in accordance with embodiments of the present invention.

FIG. 4 is a graph which shows the phase current (mA) sampled per micro-step at 25% and at 75% of the PWM period, in accordance with embodiments of the present invention. In this example the number of micro-steps per electrical rotation is 48. Each 25/75-sampled phase (phase-current) changes after 120 electrical degree. The X-axis is the time axis which is expressed in micro-steps. In this example 48 micro-steps per electrical period are implemented, with a maximum phase-voltage in points 0,8,16, . . . . The current samples [I1 . . . I9] are 9 ADC samples during an extremum period around max. voltage in microstep period [4 . . . 12], [12 . . . 20], etc. The arrow between [I1 . . . I9] is the indication for the normalized difference that is calculated in systems and methods in accordance with embodiments of the present invention.

The invention claimed is:

1. A lead angle estimator for estimating a lead angle of a brushless DC motor, the lead angle being the angle between a phase-voltage-vector of a phase-voltage, and a phase-current-vector of a phase-current, the lead angle estimator comprising a sampling unit and a processing unit,
the sampling unit being adapted for obtaining phase-samples which are a measure of the phase-current,
the processing unit being adapted for estimating the lead angle by calculating a difference of the phase-samples in an extremum period around a maximum or around a minimum of the phase-voltage, and by normalizing the obtained difference, wherein the processing unit is adapted for normalizing the obtained difference by dividing the difference of the phase-samples with an average of the phase-samples during the extremum period.

2. The lead angle estimator according to claim 1, wherein the lead angle estimator is adapted for obtaining the phase-samples only during the extremum period.

3. The lead angle estimator according to claim 1, wherein the extremum period is a period between 30° and 60°, centered around the maximum or minimum of the phase voltage.

4. The lead angle estimator according to claim 1, wherein the sampling unit comprises a voltage sensor adapted for measuring a voltage over a shunt resistor of the brushless DC motor, to obtain voltage samples which are a measure of the phase-current, and wherein the sampling unit is adapted for deriving the phase-samples from the voltage samples.

5. The lead angle estimator according to claim 1, wherein the sampling unit comprises an interface for triggering the sampling unit for obtaining the phase-samples.

6. The lead angle estimator according to claim 1, wherein the processing unit is adapted for calculating the difference between at least one phase-sample at the end of the extremum period and at least one phase-sample at the beginning of the extremum period.

7. The motor driver for driving a brushless DC motor, the motor driver comprising a lead angle estimator according to claim 1, and a driver unit for applying a phase-voltage per phase of the brushless DC motor wherein the processing unit is adapted for controlling the phase-voltage in a feedback loop with the estimated lead angle as feedback signal.

8. The motor driver according to claim 7, wherein the processing unit is adapted for controlling the driver unit for applying the phase-voltage as a PWM voltage.

9. The motor driver according to claim 7, wherein the processing unit is adapted for controlling the driver unit for applying the phase-voltage in discrete steps.

10. The motor driver according to claim 9, wherein the processing unit is adapted for triggering the phase sampling synchronous with the discrete steps of the phase-voltage.

11. The motor driver according to claim 7, wherein the feedback loop is a PID control loop.

12. The motor driver according to claim 7, wherein the processing unit is adapted for controlling the driver unit for applying a sine wave shaped phase-voltage.

13. A method for estimating a lead angle between a phase-voltage-vector of a phase-voltage of a brushless DC motor, and a phase-current-vector of a phase-current of the brushless DC motor, the method comprising:
obtaining phase-samples which are a measure of the phase-current;
estimating the lead angle by calculating a difference of the phase-samples in an extremum period around a maximum or around a minimum of the phase-voltage, and by normalizing the obtained difference by dividing the difference of the phase-samples with an average of the phase-samples during the extremum period.

14. The method for driving a brushless DC motor, the method comprising:
estimating the lead angle between a phase-voltage-vector of a phase-voltage of the brushless DC motor, and a phase-current-vector of a phase-current of the brushless DC motor using a method according to claim 13,
controlling the phase-voltage in a feedback loop with the estimated lead angle as feedback signal.

* * * * *